Aug. 15, 1961     L. PÉRAS     2,995,967
DEVICES FOR DRIVING WORKPIECES ON AUTOMATIC MACHINE-TOOLS
Filed Jan. 27, 1958     2 Sheets-Sheet 1
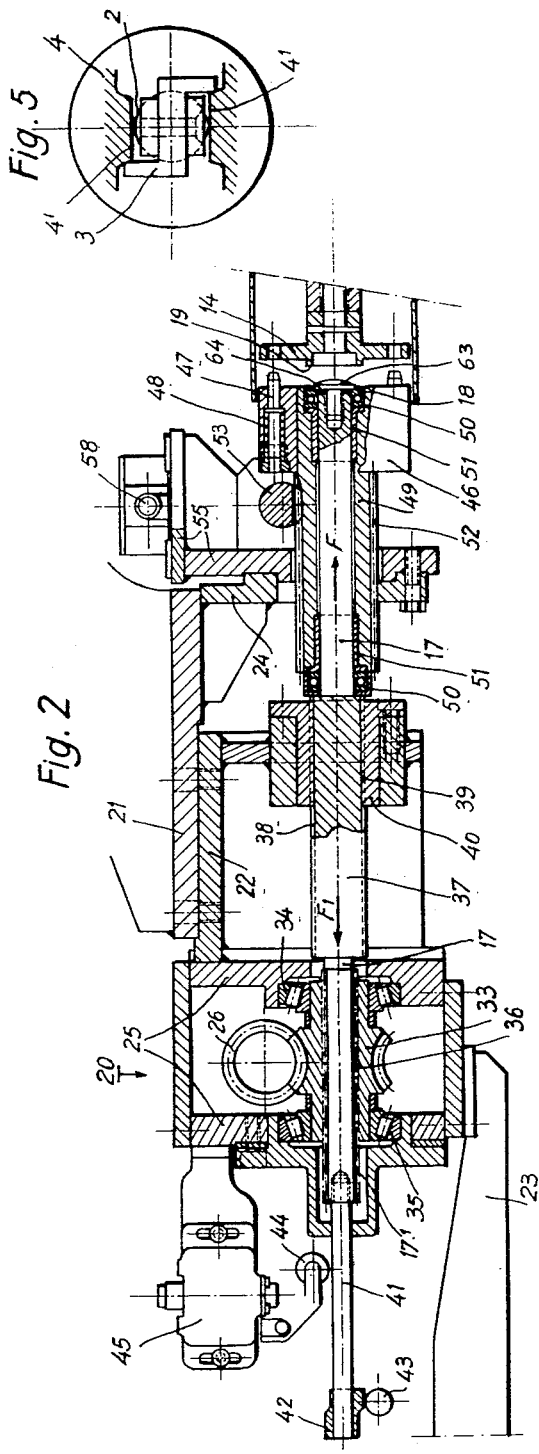
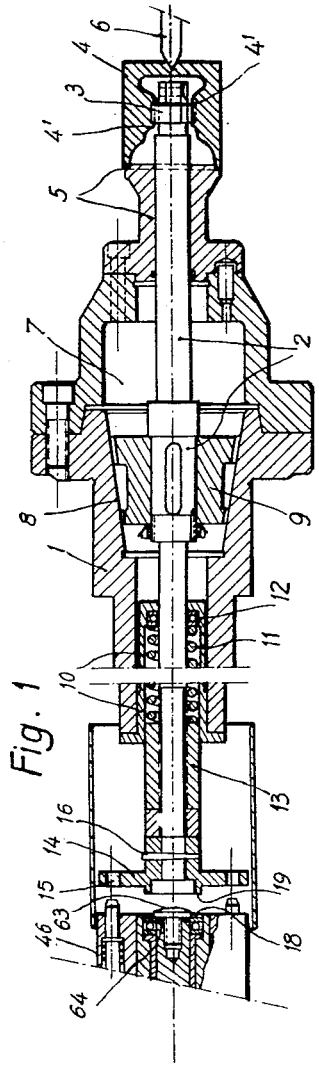

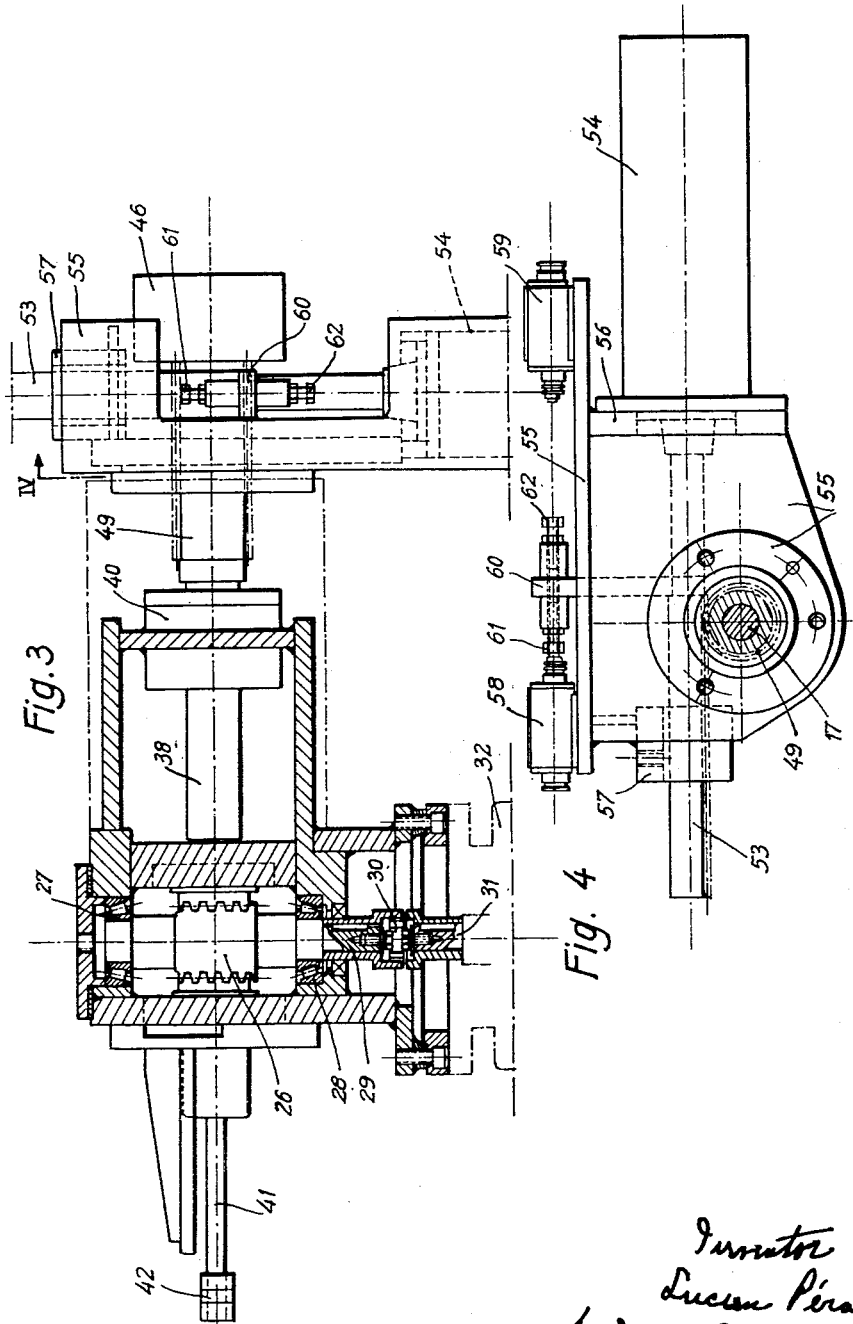

United States Patent Office 2,995,967
Patented Aug. 15, 1961

2,995,967
DEVICES FOR DRIVING WORKPIECES ON AUTOMATIC MACHINE-TOOLS
Lucien Péras, Billancourt, France, assignor to Regie Nationale des Usines Renault, Billancourt, France, a French works of the French Government
Filed Jan. 27, 1958, Ser. No. 711,361
Claims priority, application France Feb. 18, 1957
4 Claims. (Cl. 82—40)

This invention relates to a device for driving workpieces to be machined on machine-tools, which is applicable more particularly to automatic lathes of the type adapted to machine a continuous series of parts brought on the lathe headstock spindle in synchronism with the cycle of operation of the lathe.

According to this invention, the rotary work holding spindle comprises a shaft adapted to drive the workpiece for rotation about its axis, this shaft being displaceable by translation along the axis of the spindle body in order to release and discharge the workpiece upon completion of the machining thereof.

Moreover, in view of constantly maintaining the driving members carried by said shaft in the same angular position when the workpiece is fed to the machine in view of ensuring a normal and smooth fitting of the workpiece, a device is provided for properly positioning the shaft about its axis of rotation, as this shaft is likely to occupy any indefinite position about its axis at the end of the machining cycle.

According to another feature of this invention, the shaft setting device is combined with the device for moving the driving shaft in translation outside the spindle, said shaft being adapted to be disconnected from the spindle body against the resilient force of a spring-urged member by which the shaft is restored automatically to its initial position.

Finally, the different stages of the operation of the device according to this invention are adjusted with due regard to the cycle of operation of the machine with the assistance of remote-control contact units actuated by the movements of certain component elements of the device proper or of component elements of the machine-tool, for example the tool-slide and the feed device.

In any case, these features will appear more clearly from the following description of a typical and preferred form of embodiment of this invention which is given hereafter by way of example with reference to the attached drawings forming part of this specification. In the drawings:

FIGURE 1 is a longitudinal axial section of the workpiece holding spindle;

FIGURE 2 is a view similar to FIG. 1, showing the devices for displacing the spindle in the axial direction and setting the spindle angularly, these devices being normally disposed behind the spindle and coaxially to the driving shaft;

FIGURE 3 is a plane view of the arrangement illustrated in FIG. 2;

FIGURE 4 is an end view of the spindle-setting device, as seen in the direction of the arrow IV of FIG. 3; and FIGURE 5 is an end view of the spindle shaft, showing the manner in which the workpieces—in this case engine pistons—are driven.

Referring first to FIG. 1 of the drawings, the workpiece holding spindle 1 of the lathe is provided with a shaft 2 for driving the workpieces. This shaft 2 carries at its front end a substantially Z-shaped extension 3 acting somewhat like a double driving pin adapted effectively to drive the workpiece (in the case illustrated a piston 4 brought to its machining position) by engaging the two inner bosses $4^1$ in which the gudgeon pin is to be subsequently fitted (see FIGS. 1 and 5). The piston 4 to be machined is centered on the other hand through the medium of a shouldered body of revolution 5 integral with the spindle and receiving on its outer front shouldered edge the piston skirt, and also by means of the tailstock spindle 6 of the lathe engaging a tapered cavity formed in the piston crown.

The shaft 2 is rotatably driven from the spindle 1 formed with a bore 7 the tapered portion 8 of which co-acts with a splined driving cone 9 locked and keyed on the shaft 2.

This shaft 2 is formed with an extension at the rear of the spindle body and is slidably mounted in the latter at the front of the body of revolution 5 and at the rear in a socket 10 fitted on the spindle body, as shown.

This shaft 2 is urged to its position of driving engagement with the spindle 1 by a spring 11 bearing with one end against a thrust ball-bearing 12 in the bottom of the socket 10, and with the other end against a ring 13 locked on the shaft 2 and slidably engaging the socket bore. This shaft 2 carries in addition on its rear end a plate 14 for positioning the driving pin 3, this plate 14 being provided to this end with positioning holes 15 of which two, spaced 180-degrees, are provided in this example, the plate 14 being mounted in a predetermined position on the shaft 2 with the assistance of a taper pin 16.

The feed movement of the driving shaft 2 in the axial direction of the spindle is obtained by means of a device comprising a push shaft 17 driven for axial movement in axial alignment with the shaft 2. This push shaft 17 is provided with a stop 18 consisting in the case illustrated of the outer race of a thrust bearing 50 and registering with a thrust portion 19 formed on the plate 14 of shaft 2. This thrust bearing 18 retained on the push shaft by a screw 63 tightened on a washer 64 is allowed to rotate slightly during the angular positioning of the driving shaft. The axial displacement device 20 is suitably supported by the frame 21 of the lathe at 22 and 23, and a device for the angular setting of the shaft 2, which is partly supported at 24, comprises elements mounted on the front portion of the push shaft 17 as will be explained presently.

This translation device must be capable of developing a relatively great force in order to overcome the resistance of the compression spring 11 intended, as already set forth hereinabove, for urging the driving cone 9 in the spindle body; consequently, this force must be calculated as a function of that exerted by the tools on the workpiece during the operation of the machine. To this end the translation device comprises a worm-and-gear mechanism meshing with the shaft 17 and enclosed in a case 25 through which this shaft extends as shown in the left-hand portion of FIGS. 2 and 3. This mechanism comprises a multi-thread worm 26 rotatably mounted in the case 25 by means of taper roller bearings 27, 28 and formed integrally with a stub shaft 29 driven through an Oldham joint 30 interposed between the worm and the shaft 31 of an electromotor 32. The worm 26 meshes with a tangent gear-wheel 33 mounted in the case 25 by means of a pair of taper roller bearings 34, 35. The bore 36 of the tangent wheel 33 is tapped and engaged by the screw-threaded portion $17^1$ of shaft 17 screwed in the gear wheel when the parts are assembled. The shaft 17 comprises several portions separated from each other by steps or shoulders and one of these portions is a central portion 37 formed with rectilinear splines 38 coacting with corresponding splines 39 formed in the bore of a stationary hub 40 to guide the push shaft along a rectilinear axial path and without allowing this shaft to rotate when the electromotor 32 is running. A rod 41 screwed in the rear end of shaft 17 carries a double cam 42 adapted in the extreme positions of shaft 17 to co-act with rollers 43, 44 of a pair of contact units of which only one is shown at 45.

The device for angularly setting the shaft 2 comprises a positioning block or cylinder 46 registering with the plate 14; this block 46 is provided with retractable bolts 47 urged to their projecting position by springs 48 and adapted under certain conditions to provide a rigid coupling between the block 46 and plate 14 by engaging the positioning holes 15 of this plate 14. The block 46 is force-fitted on a spur pinion 49 mounted on the push shaft 17 between two thrust ball-bearings 50 with the interposition of a pair of smooth bearings 51 force fitted in the bore of pinion 49. The teeth 52 of the spur pinion 49 have a length at least equal to that of the stroke of the push shaft 17. This pinion 49 and therefore the positioning block 46 are driven for rotation by means of a rack 53 disposed across the shaft 17 and actuated from a double acting pneumatic cylinder 54. The aforesaid support 24 also serves as a means for securing a bracket 55 provided with fixation flanges 56, 57, adapted to secure the cylinder 54 and to guide the movable rack 53, respectively (see FIGS. 2, 3 and 4).

The stroke of the rack 53 is limited in both directions by limit switches 58, 59 secured on the bracket 56. A lug 60 mounted on the movable member of the rack 53 is provided with adjustable screws 61, 62 co-acting with the aforesaid limit-switches 58, 59, whereby the rack stroke and therefore the angular setting of plate 14 can be adjusted as desired.

The operation of the above-described device according to this invention, during one cycle of operation of the machine, is as follows:

During the machining of a piston, the driving shaft 2 and push shaft 17 are in the relative positions illustrated in FIGS. 1 and 2 of the drawings, the same also applying to plate 14 and block 46. Upon completion of the machining operation, the tool-slides or like tool-holders of the lathe (not shown) stop the operation of the workpiece-carrying spindle 1 and control the backward movement of the tailstock spindle 6. At the same time the electromotor 32 is started and rotates the screw 26 and the tangent gear wheel 33 meshing therewith. As the inner threads of the wheel 33 rotate, the screw-threaded portion 17¹ of the push shaft 17 is moved in the axial direction, with respect to the splined portion 37 of this shaft, inside the splined hub 40. As the push shaft 17 is thus displaced in the direction of the arrow F, its thrust bearing 18 engages the stop 19 of plate 14, so that the driving shaft 2 itself is moved in translation in the direction F. During this axial movement of the driving shaft 2, the driving cone 9 is released from the tapered bore 8 of the spindle and moves within the cavity 7, as the spring 11 is directly compressed by the ring 13.

When the cam 42 actuates the contact unit 45, the latter stops the electromotor and therefore the stroke of the driving shaft 2.

At the beginning of the stroke accomplished by the driving shaft the freshly machined piston 4 has been released from the ring 5 of the spindle and subsequently transferred by the shaft onto a suitable device for receiving and delivering the machined workpieces.

As the driving shaft 2 completes its stroke, the cylinder 54 and rack 53 are started, the rack causing the pinion 49 and therefore the block 46 to rotate. This block 46 is thus moved toward the plate 14 and the retractable bolts 47 engage the positioning holes 15 so that the driving shaft becomes coupled with the flange or plate 14. Upon completion of the stroke of rack 53, the screw 62 carried by the lug 60 engages the limit switch 59 and stops the cylinder 54 and therefore the rack 53. This end position of rack 53 is so adjusted that the positioning block 46, under the control of the driven plate 14, sets the shaft 2 and more particularly the workpiece driving pin 3 in the proper position for receiving another piston which will fit on the spindle as shown in FIGS. 1 and 5.

Moreover, also upon completion of the rack stroke, the electromotor 32 is started but in the reverse direction of rotation and the push shaft is thus moved backward through a sequence of operations taking place in the reverse direction with respect to the above description (see arrow F¹).

The driving shaft 2 urged by the return spring 11 moves in the same direction until the driving cone 9 re-engages the tapered bore 8 of the spindle body.

It will be observed that, during this movement, the shaft 2 is maintained in its preferential angular setting as the plate 14 is prevented from rotating relative to the block 46 (see bolts 47) and the block 46 itself is also prevented from moving about its axis by the meshing engagement between the pinion 49 and the rack 53 held against movement.

Then, as the driving shaft 2 resumes its cone-clutch engaging position, the push shaft 17 continues along its backward movement to its initial position, that is until the cam 42 actuates the roller 43 controlling the contact unit to stop the electromotor 32.

The freshly machined piston just released from the shaft 2 due to the backward movement of the latter is replaced in any suitable and known manner by another piston presented in axial alignment with the tailstock spindle 6 in the proper angular setting; then, this spindle 6 is moved toward the piston and causes it to fit on the properly positioned spindle.

The piston feeding device may be used, for example, to control upon completion of the machining operation the movement of the cylinder 54 to restore the rack 53 to its initial position, and also to re-start the lathe spindle and commencing the machining of the newly-delivered piston.

I claim:

1. In a machine-tool, such as an automatic lathe, means for driving a workpiece comprising a rotatable drive spindle adapted to hold at one end a workpiece loaded in a predetermined angular position, a shaft rotatably mounted coaxially within the spindle and having means at one end for engaging and rotatably driving the workpiece, means drivingly connecting the shaft to the spindle so that it is rotated thereby, means for moving said shaft in a motion of translation relative to the spindle for unloading the spindle and simultaneously disengaging said connecting means, and means operative during the disengagement of said connecting means for moving the shaft about its axis to a selected angular position corresponding to said angular position of loading of the workpieces.

2. In a machine-tool, as claimed in claim 1, wherein said shaft is moved in an axial direction to disengage said connecting means, and wherein said means for moving said shaft comprises a rectilinearly moving pusher assembly disposed rearwardly of and in selected engagement with the shaft.

3. In a machine-tool, as claimed in claim 1, wherein said means for moving the shaft to a selected angular position includes a rotary driving member having limit positioning means operatively associated therewith and a driven member carried by the shaft and selectively coupled with said driving member.

4. In a machine-tool, such as an automatic lathe, a device for driving a workpiece, said device comprising a rotatably driven spindle body provided with means for centering a workpiece, a workpiece driving shaft rotatably mounted coaxially in said spindle body and formed at its front end with pins adapted to engage and drive the workpiece, clutch means operatively coupled between said driving shaft and spindle body to provide a drive path therebetween, spring means operatively disposed for constantly urging said driving shaft to a position in which it is drivingly connected to said spindle body by biasing said clutch means into an engaged position, a positioning plate carried by the rear end of said driving shaft, a push shaft disposed at the rear of said driving shaft and in axial alignment therewith, a block rotatably mounted on the front end of said push shaft, retractable spring-loaded bolts carried by the block and adapted to engage and place in a given angular position corresponding holes formed in the positioning plate carried by said driving shaft, a pinion integral with said push shaft, a transverse rack in sliding and meshing engagement with said pinion and a fluid-actuated control cylinder operatively connected to said rack.

References Cited in the file of this patent

UNITED STATES PATENTS

| | | |
|---|---|---|
| 1,841,988 | Smith et al. | Jan. 19, 1932 |
| 2,473,108 | Meyer | June 14, 1949 |
| 2,535,246 | Welch | Dec. 26, 1950 |
| 2,646,152 | Retz | July 21, 1953 |
| 2,779,447 | Retz | Jan. 29, 1957 |
| 2,807,974 | Meyer | Oct. 1, 1957 |
| 2,877,676 | Swanson et al. | Mar. 17, 1959 |

FOREIGN PATENTS

| | | |
|---|---|---|
| 156,088 | Great Britain | Mar. 6, 1922 |
| 616,019 | Germany | July 17, 1935 |